United States Patent
Saija

(10) Patent No.: US 11,385,317 B2
(45) Date of Patent: Jul. 12, 2022

(54) METHOD FOR PROVIDING POSITION INFORMATION IN A SECURE MANNER, AND A TERMINAL DEVICE AND A COMPUTER PROGRAM PRODUCT THERETO

(71) Applicant: Telia Company AB, Solna (SE)

(72) Inventor: Timo Saija, Espoo (FI)

(73) Assignee: TELIA COMPANY AB, Solna (SE)

( * ) Notice: Subject to any disclaimer, the term of this patent is extended or adjusted under 35 U.S.C. 154(b) by 231 days.

(21) Appl. No.: 16/892,927

(22) Filed: Jun. 4, 2020

(65) Prior Publication Data

US 2020/0386847 A1    Dec. 10, 2020

(30) Foreign Application Priority Data

Jun. 4, 2019 (FI) .................................... 20195474

(51) Int. Cl.
| | |
|---|---|
| *H04W 24/00* | (2009.01) |
| *G01S 5/02* | (2010.01) |
| *H04W 64/00* | (2009.01) |
| *H04W 12/63* | (2021.01) |

(52) U.S. Cl.
CPC ............ *G01S 5/0289* (2013.01); *H04W 12/63* (2021.01); *H04W 64/003* (2013.01); *H04W 64/006* (2013.01)

(58) Field of Classification Search
CPC combination set(s) only.
See application file for complete search history.

(56) References Cited

U.S. PATENT DOCUMENTS

| | | | |
|---|---|---|---|
| 10,244,389 B1* | 3/2019 | Earnhardt, Jr. | ........ H04W 12/03 |
| 2006/0223518 A1* | 10/2006 | Haney | ..................... H04L 67/42 |
| | | | 455/420 |
| 2010/0014676 A1 | 1/2010 | Mccarthy et al. | |
| 2014/0331329 A1 | 11/2014 | Edge et al. | |
| 2018/0184287 A1* | 6/2018 | Khan | .................... G01S 5/0236 |

FOREIGN PATENT DOCUMENTS

| | | |
|---|---|---|
| EP | 3 451 722 A1 | 3/2019 |
| WO | 2017/134295 A1 | 8/2017 |

OTHER PUBLICATIONS

FI Search Report, dated Feb. 3, 2020, from corresponding FI application No. 20195474.
European Search Report issued in Patent Application No. EP 20 17 7640 dated Oct. 15, 2020.

* cited by examiner

*Primary Examiner* — Justin Y Lee
(74) *Attorney, Agent, or Firm* — Nixon & Vanderhye

(57) ABSTRACT

Disclosed is a method for generating position information of a terminal device served by a mobile communication network. The method including: receiving at least one signal carrying data applicable in a determination of a position of the terminal device; determining the position of the terminal device, applying a masking function to determined position data, determining a slice within a time-dependent network representation in accordance with at least one network characteristic determined by the terminal device, and generating a data record including: a masked position data; information on the determined slice; and at least one network parameter applied by the masking function. Also disclosed is a terminal device and a computer program product.

20 Claims, 3 Drawing Sheets

METHOD FOR PROVIDING POSITION INFORMATION IN A SECURE MANNER, AND A TERMINAL DEVICE AND A COMPUTER PROGRAM PRODUCT THERETO

TECHNICAL FIELD

The invention concerns in general the technical field of telecommunications. More particularly, the invention concerns a management of position information of a terminal device.

BACKGROUND

It is commonly known that a position of a terminal device may be determined in a plurality of ways. For example, the terminal device, or the mobile communication network, may be configured to be capable of determining a position of the terminal device on a basis of information derivable from the mobile communication network either directly or indirectly. In case the positioning is performed by the mobile communication network the entity performing the positioning may use measured power levels and antenna patterns and use the concept that terminal device communicates with one of the closest base stations. If the positioning is performed by the terminal device, it may be arranged to measure signal strengths experienced by the terminal device in its location and to determine the position by using the signal strength information together with network related information received from a telecom operator over signaling.

Further, at least some of the existing terminal devices nowadays are equipped with a module suitable for receiving signals from a satellite based navigation system, such as Global Positioning System (GPS) or Global Navigation Satellite System (GLONASS). Those are based on a receipt of signals from at least three satellites, preferably from at least four satellites. Fundamentally, the idea e.g. in the GPS system is that the receiver measures times of arrivals of the satellite signals. From the times of arrivals and times of transmission (information included in the received signal) the receiver may compute its position.

In some implementations, the positioning may be a combination of the satellite based positioning and the mobile communication network based positioning. In such an implementation the position data derived from the satellite based positioning system may be improved, or assisted, with the network based positioning information. This kind of approach is commonly known as assisted GPS (A-GPS).

A simplicity of positioning of the terminal device generates also challenges as it comes to privacy issues. Namely, there is a threat that a position of a terminal device may be accessed unintentionally and/or easily by $3^{rd}$ parties especially in solutions in which the terminal devices are modified versions from devices complying with existing specifications. An example of such a device may e.g. be a terminal device intended to support mobile communication networks dedicated to specific use. For safety reasons it may even be risky if $3^{rd}$ parties may access a position information of a terminal device belonging to an authority, or to any other person identifiable from any data source.

Hence, there is need to develop solutions by means of which it is possible to improve privacy of users of terminal devices utilizing services provided by at least one mobile communication network.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a method, a terminal device and a computer program product for generating position information of the terminal device.

The objects of the invention are reached by a method, a terminal device and a computer program product as defined by the respective independent claims.

According to a first aspect, a method for generating position information of a terminal device served by a mobile communication network is provided, the method comprising: receiving, by the terminal device, at least one signal, the at least one signal carrying data applicable in a determination of a position of the terminal device; determining the position of the terminal device expressed as a position data based on the at least one received signal; applying a masking function to determined position data, the masking function is dedicated to the terminal device; determining a slice within a time-dependent network representation in accordance with at least one network characteristic determined by the terminal device, the network representation describing a coverage of a cell as a plurality of sectors comprising a number of slices; generating a data record comprising: a masked position data of the terminal device; information on the determined slice; and at least one network parameter applied by the masking function, the at least one network parameter determined by the terminal device.

The at least one signal carrying data applicable in the determination of the position of the terminal device may be received from a number of base stations of the mobile communication network. Further, the at least one signal carrying data applicable in the determination of the position of the terminal device may be received from a number of satellites of a satellite-based navigation system in addition to the signal received from the number of base stations of the mobile communication network.

Moreover, the network representation of the mobile communication network may be updated in accordance with a predetermined schedule.

An indication of the network representation may be included in the generated data record. For example, the indication may comprise at least one of: an identifier of the used network representation, a time stamp indicating an instant of time of the masking.

At least one terminal device specific seed value received from the mobile communication network and at least one network parameter may be applied as variables in the masking function. For example, the at least one network parameter may be at least one of: a modulation scheme assigned to the terminal device, a signal strength experienced by the terminal device, a distance of the terminal device from the base station serving the terminal device.

Still further, the at least one network characteristic used for determining the slice is at least one of: modulation assigned to the terminal device, signal strength experienced by the terminal device, distance of the terminal device from the base station serving the terminal device.

According to a second aspect, a terminal device for generating position information is provided, the terminal device is served by a mobile communication network, the terminal device comprising: at least one processor; at least one memory including computer program code; wherein the at least one memory and the computer program code configured to, with the at least one processor, cause the terminal device to perform: receive at least one signal, the at least one signal carrying data applicable in a determination of a position of the terminal device; determine the position of the terminal device expressed as a position data based on the at least one received signal; apply a masking function to determined position data, the masking function is dedicated to the terminal device; determine a slice within a time-dependent network representation in accordance with at least one network characteristic determined by the terminal device, the network representation describing a coverage of a cell as a plurality of sectors comprising a number of slices; generate a data record comprising: a masked position data of the terminal device; information on the determined slice; and at least one network parameter applied by the masking function, the at least one network parameter determined by the terminal device.

The terminal device may be arranged to receive the at least one signal carrying data applicable in the determination of the position of the terminal device from a number of base stations of the mobile communication network.

The terminal device may be arranged to receive the at least one signal carrying data applicable in the determination of the position of the terminal device from a number of satellites of a satellite-based navigation system in addition to the signal received from the number of base stations of the mobile communication network.

Further, the terminal device may be arranged to update the network representation of the mobile communication network in accordance with a predetermined schedule.

The terminal device may be arranged to include an indication of the network representation in the generated data record.

The terminal device may be arranged to apply as variables of the masking function at least one terminal device specific seed value received from the mobile communication network and at least one network parameter. For example, the terminal device may be arranged to use as the at least one network parameter at least one of: a modulation scheme assigned to the terminal device, a signal strength experienced by the terminal device, a distance of the terminal device from the base station serving the terminal device.

The terminal device may be arranged to use as the at least one network characteristic used for determining the slice at least one of: modulation assigned to the terminal device, signal strength experienced by the terminal device, distance of the terminal device from the base station serving the terminal device.

According to a third aspect, a computer program product for generating position information is provided which computer program product, when executed by at least one processor, cause the terminal device to perform the method as described above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features.

The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically a non-limiting example of a communication system into which the invention according to an embodiment may at least in part be implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
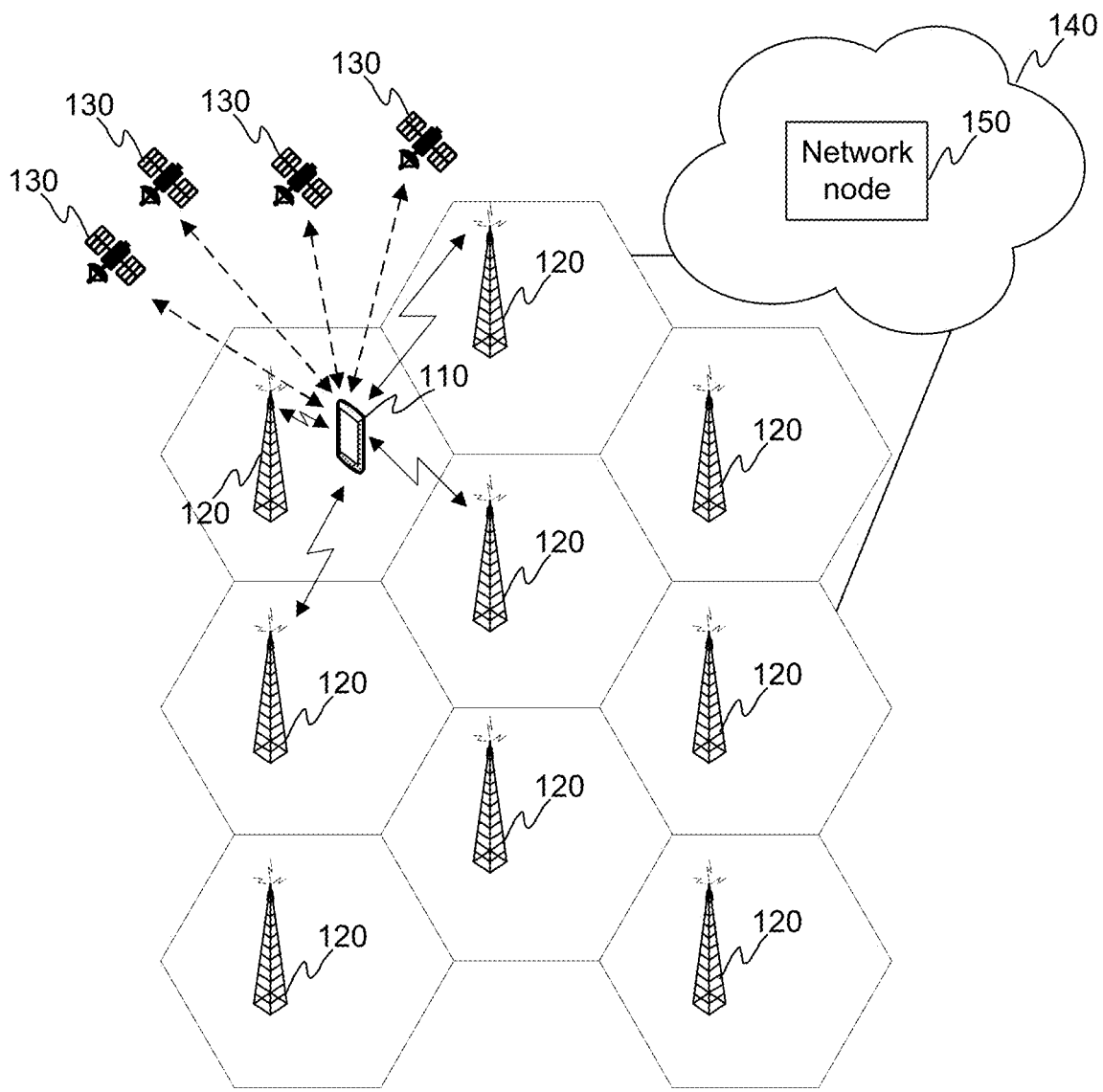

FIG. 1 illustrates schematically a non-limiting example of a communication system into which the present invention may at least in part be implemented to. The communication system may comprise a mobile communication network consisting of a plurality of cells. Each cell is defined by a radio coverage provided by a base station 120 to the cell in question. A terminal device 110 may roam in a service are of the mobile communication network and be communicatively coupled to at least one base station 120. Additionally, the terminal device 110 may be arranged to receive signaling from a plurality of base stations 120. The base stations 120 form at least a part of a radio access network (RAN). The FIG. 1 also disclose a core network 140 of the mobile communication network wherein at least one network node 150 may also be involved in a context of the present invention as will be described. The entities in the core network 140 may be communicatively coupled to a radio access network, such as to one or more control entities controlling an operation of one or more base stations 120 therein. The communication system may comprise, in addition to the mobile communication network, a satellite 130 based system. The terminal device 110 may be equipped with a module, such as a chip, by means of which it is possible at least to receive signals from the satellites 130. In other words, the satellites 130 may be used for positioning the terminal device 110.

Figure 2:
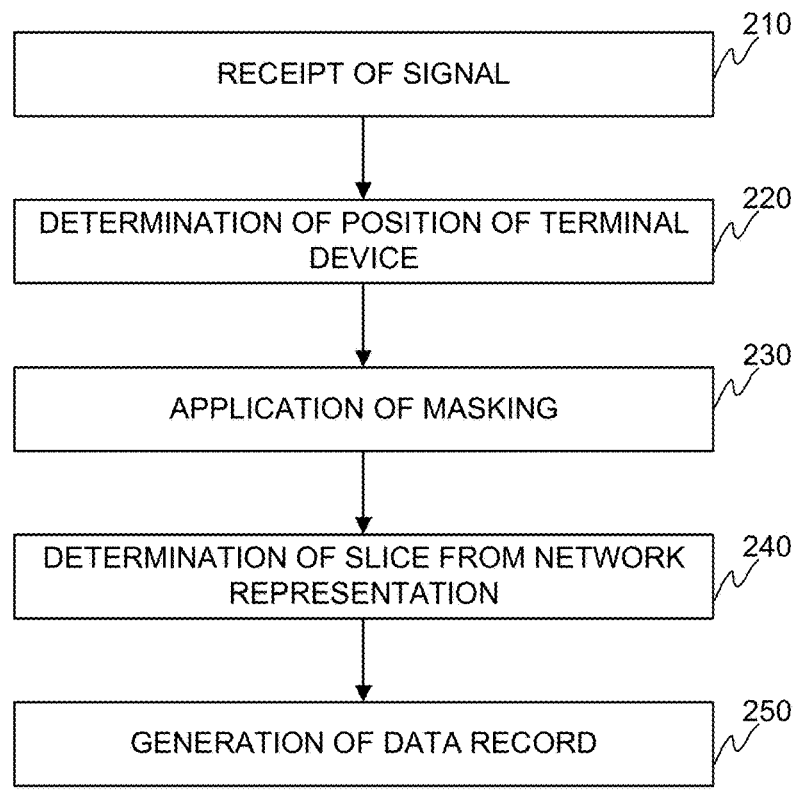
FIG. 2 illustrates schematically a method according to an embodiment of the invention.

Next, some aspects of the present invention are described by referring to FIG. 2 schematically illustrating a method according to various embodiments of the invention. The method in FIG. 2 is illustrated from a terminal device 110 point of view, wherein the terminal device 110 is at least in connection with mobile communication network. According to an example embodiment the method may start with a receipt 210 of at least one signal by the terminal device 110.

The received signal may carry data suitable for determining 220 a position of the terminal device 110. Hence, the at least one signal may be received from a number of sources, such as from the mobile communication network or from another system like satellite based positioning system.

In case, the positioning of the terminal device 110 is based on a receipt of the at least one signal from the mobile communication network it may be implemented so that the terminal device 110 receives signals from a number of base stations 120, such as from three base stations 120. In response to the receipt of the signals the terminal device 110 may be arranged to determine its position. For example, the terminal device 110 may determine time difference in arrival of a signal transmitted concurrently by a plurality of the base stations 120 by means of which it is possible to determine a distance of the terminal device 110 with respect to the base stations 120. By determining relative location of the terminal device 110 with respect to the base stations 120 it is possible to generate information which may be translated to an absolute position of the terminal device 110 since coordinates of the base stations 120 are known.

As mentioned, the terminal device 110 may also be equipped with a module which may receive signals from satellites 130 belonging to a satellite based positioning system, such as GPS or GLONASS. Based on information carried in the signal and received by the module the terminal device 110 may be arranged to determine 220 its position in a known manner. The position information derived from the satellite based positioning system, or from any other system, may be used together with the position information determined from signals received from the mobile communication network.

The above described various methods for determining 220 the position of the terminal device 110 are non-limiting examples, and other solutions may also be applied to. For example, the terminal device 110 may determine, or receive, its position on a basis of signals received locally from locally operated systems. For example, there may be a beacon device arranged to transmit position information which is received by the terminal device 110, and the terminal device 110 may be derive its position in such a manner. Naturally, the terminal device 110 may be arranged to determine its position by applying a plurality of positioning methods and by combining the position data from the plurality of positioning methods in a predetermined manner. A non-limiting example of such a combined positioning method may be so-called assisted GPS (A-GPS). Alternatively, the terminal device 110 may be arranged to determine its position in a plurality of ways and maintain the position data derived with different methods separate. In response to the determination 220 of the at least one position information of the terminal device 110 the terminal device 110 may be arranged to perform an operation by means of which the at least one position information may be masked in such a manner that even if an unauthorized $3^{rd}$ party gets access to the position information the $3^{rd}$ party may not be able to determine a real position of the terminal device 110, or at least that the determination is computationally challenging. In order to do this the terminal device 110 may be arranged to apply 230 a masking function to the position data determined 220 by the terminal device 110. An application of the masking function 230 refers to an arrangement in which the terminal device 110 receives the masking function from the network e.g. in a context of provisioning the terminal device 110 in the mobile communication network. Moreover, the mobile communication network may be arranged to transmit one or more seed values to the terminal device 110 to be used in the masking function. In addition to this, the masking function may receive, as a further variable, at least one network parameter. The at least one network parameter may e.g. be a modulation scheme (i.e. applied modulation) assigned to the terminal device 110, a signal strength experienced by the terminal device 110, a distance of the terminal device 110 from the base station 120 serving the terminal device 110 as well as time related parameters, such as time elapsed from previous masking or positioning. For sake of clarity it is worthwhile to mention that in various embodiments the masking function may receive a plurality of network parameters as variables, and, thus, to be used in masking the position data determined by the terminal device 110.

Figure 3:
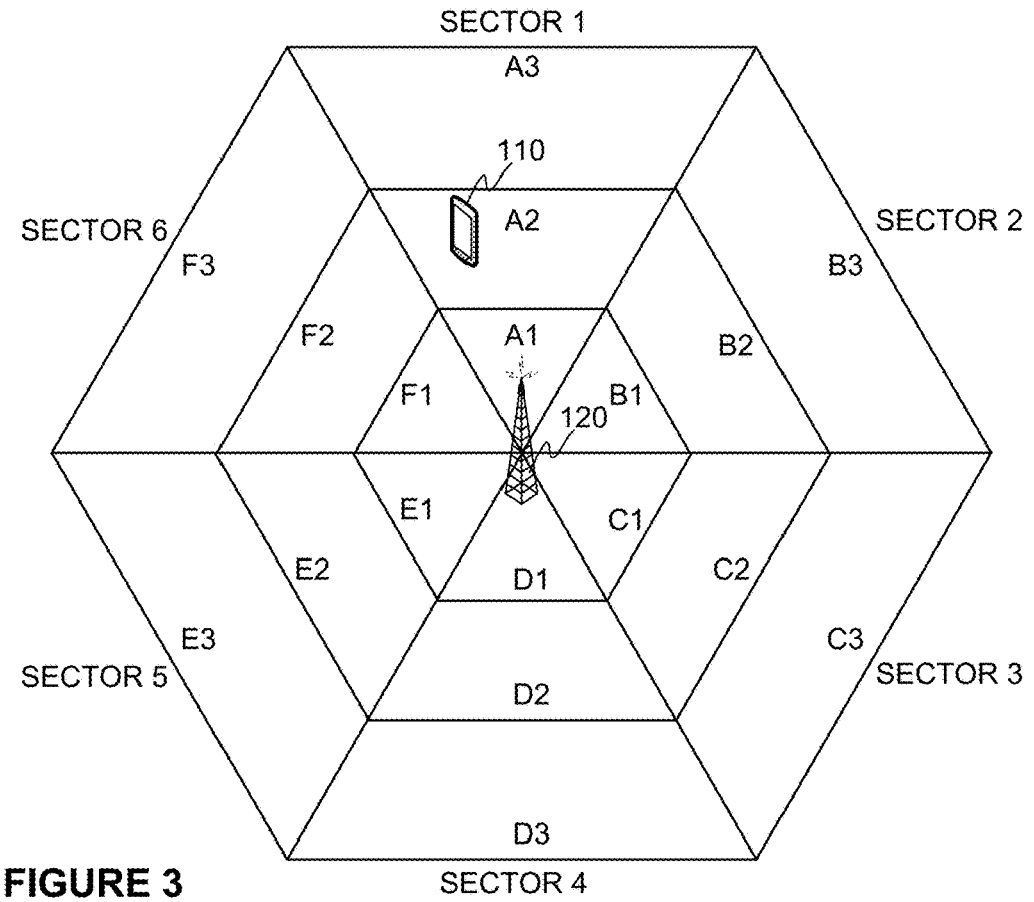
FIG. 3 illustrates schematically a network representation of a cell at a first instant of time according to an embodiment of the invention.

Moreover, the terminal device 110 may be arranged to determine a slice 240 from a time-dependent network representation. The time-dependent network representation may be established on a cell basis. The time-dependent network representation refers to an arrangement that the network representation changes in time sequentially under a predetermined scheme. FIG. 3 illustrates schematically a non-limiting example of a network representation of a cell at an instant of time t0. The network representation of the cell may be established so that the cell is divided to sectors (sector 1, sector 2, sector 3, sector 4, sector 5, sector 6), and each sector may be divided to slices (A1, A2, A3; B1, B2, B3; C1, C2, C3; D1, D2, D3; E1, E2, E3; F1, F2, F3). The slicing may e.g. be arranged in accordance with a distance from a centre of the cell.

The terminal device 110 is arranged to be aware of the network representation in use at an instant of time. This may be arranged so that the terminal device 110 is storing a plurality of network representations in a memory and the terminal device is arranged to be aware of which network representation is applied at an instant of time. For example, the terminal device 110 may apply a time-dependent function being also aware of by the mobile communication network which defines a network representation to be applied. Alternatively or in addition, the mobile communication network may transmit a signal, such as through broadcasting, indicating the network representation to be applied to. As mentioned, the network representation may be stored in a memory accessible by a processing unit of the terminal device 110. The memory may be a memory of the terminal device 110, but more preferably a memory of a subscriber identity module included in the terminal device 110. The use of the memory of the subscriber identity module is preferred in a sense that it is fully manageable by a telecom operator providing the subscription. Hence, an access to the stored network representations is heavily limited improving security aspects.

According to various embodiments the terminal device 110 may be arranged to determine a slice within the time-dependent network representation in accordance with at least one network characteristic determined by the terminal device 110. The at least one network parameter may e.g. be at least one of: a modulation scheme assigned to the terminal device 110, a signal strength experienced by the terminal device 110, a distance of the terminal device 110 from the base station 120 serving the terminal device 110. In other words, the slicing may be established by using at least one of the mentioned network parameters in the establishment of the network representation. For example, the slicing may be based on an adaptive modulation scheme used by the mobile communication network with the terminal device residing in cells with different kinds of radio characteristics.

Generally speaking, a network cell may be divided into sectors and slices, as schematically illustrated e.g. in FIG. 3 as a non-limiting example. A formulation of the network cells in the manner as described may e.g. be based on arranging the slicing so that the slices over all the sectors are determined by possessing at least one similar or comparable network characteristic, such as a signal strength, in each area of the cellular coverage (i.e. A3, B3, . . . F3 in FIG. 3 or 4). Hence, an adaptive modulation scheme may be applied respectively depending e.g. on the signal strength and a distance from the base station 120, such as QAM, QPSK, BPSK or anything other applicable modulation in OFDM, for example, as well as seed values or any other similar values. The rotation applied to the network representation may be based on moving a position from one QAM modulated coverage area to another QAM modulated coverage area. Specific modulation schemas may be applied to extend the coverage. The rotation and hopping schema may, however, also be applied otherwise, i.e. moving position from one modulation to another modulation in accordance to a need.

In response to the determination 240 of the slice the terminal device 110 may be arranged to generate 250 a data record to be delivered to the mobile communication network. The terminal device 110 may be arranged to include at least the masked position data, an indication on the determined slice and at least one network parameter determined by the terminal device 110 in the data record. Alternatively or in addition, the data record may comprise an indicator for indicating the network representation which was applied to masking. In this manner it is possible to deliver pieces of data to a party obtaining the data record and, in that manner, to enable the receiving party to derive the position of the terminal device 110 as a real position, such as in coordinates. Depending on the implementation the indicator may be an identifier of the used network representation or alternatively it may be a time stamp indicating an instant of time of the masking. The time information may be used by the recipient to solve the network representation. The terminal device 110 may be arranged to transmit the generated data record to the base station 120 serving it in the mobile communication network. The base station 120 in question may detect that the received data record at least the mentioned pieces of data and deliver the data record to a predetermined entity. The predetermined entity may e.g. be a network management entity, such as MME, of the mobile communication network which may deliver the data record to a final entity, such as to a network device, such as a server device, arranged to implement location based services in the mobile communication network.

In response to the receipt of the data record the network entity may be arranged to de-mask the position data of the terminal device 110 from the data record. The de-masking of the position data may refer to applying an inverse function to the used masking function. Hence, the network entity performing the de-masking is aware of the used masking function at the terminal device 110 as well as the at least one seed value assigned to the terminal device 110 as a variable for the masking function. Additionally, since the at least one network parameter used in the masking function is also delivered in the data record, it may be used in the de-masking the position data of the terminal device 110. Hence, the de-masking provides the positioning data established at least based on mobile network based information, and possibly with some other positioning mechanism, available in the similar way as it was before the masking, such as expressed in coordinates.

Further, the used network representation may be determined e.g. on a basis of time stamp included in the data record indicating a time of the determination of the slice. Alternatively, both the terminal device 110 and the network node may be synchronized to be aware of the network representation to be used in accordance with time. This may e.g. be arranged by establishing a predetermined scheme indicating the network representation to be used in accordance with time which is stored in a memory accessible by the terminal device 110 and in a memory accessible by a respective network element. In response to the de-masking of the position data the network entity in question may be arranged to deliver the position data of the terminal device 110 in accordance with pre-defined rules controlling the operation of the network element.

Figure 4:
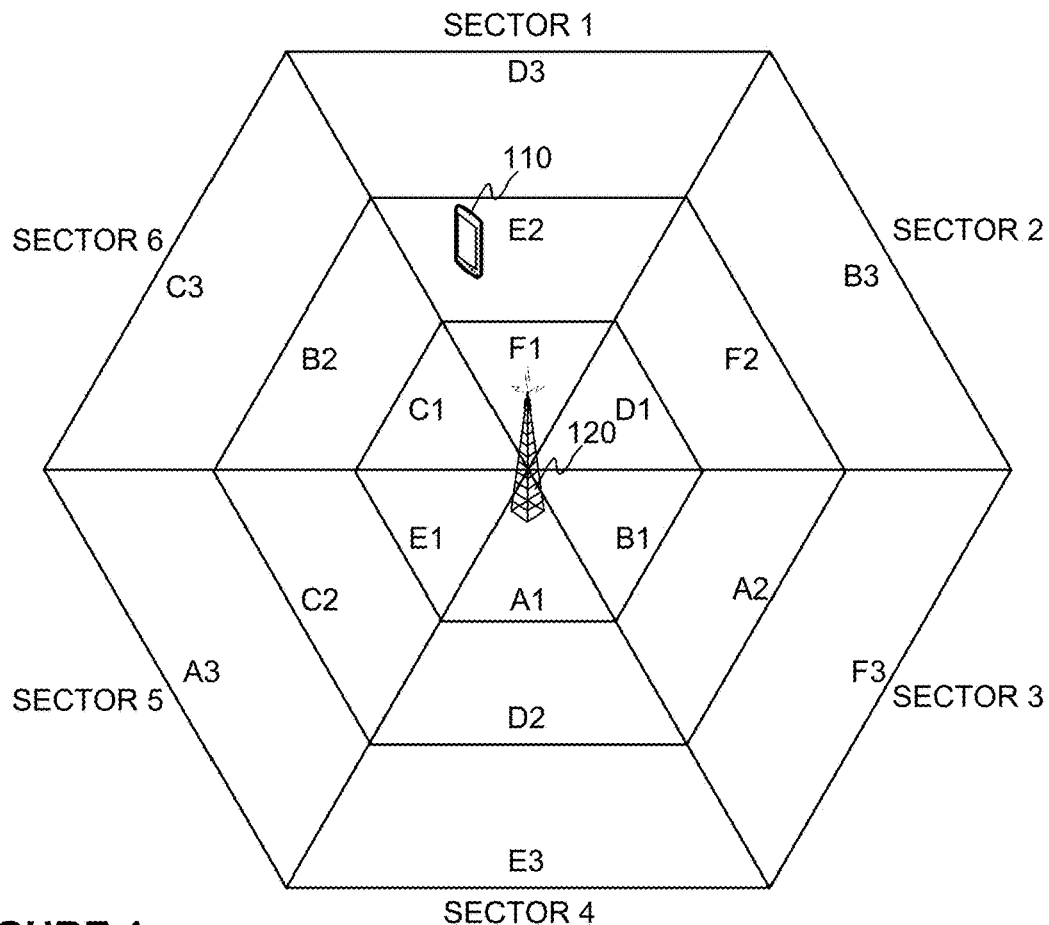
FIG. 4 illustrates schematically a network representation of a cell at a second instant of time according to an embodiment of the invention.

As mentioned in the foregoing description the network representation is time dependent. This refers to an arrangement that the network representation is arranged to change in time. FIG. 4 illustrates schematically, for exemplifying purposes, a network representation at another instant time t1 to the one illustrated in FIG. 3. As may be seen at least some of the slices have changed their places in the sectors. A predetermined pattern for implementing the change in the places of the slices may be applied, which may be known by the parties being involved in the use of the present invention as described In the above it is described that in various embodiments of the invention the terminal devices 110 may apply a masking function to the position data and in that manner to generate a data record comprising at least masked position data of the terminal device 110. Information on the used network representation may also be provided as discussed in the foregoing description.

In some implementations a network, e.g. under control of a network node 150, may be configured to generate a signal receivable by terminal devices 110 within an operational area of the network wherein the signal is arranged to carry an indicator of a network representation applied at an instant of time. According to some other implementation the network node 150 may be arranged to generate a signal carrying data indicating a schedule according to which the network representations are changed. An algorithm of the change in accordance with the time may be stored in a memory accessible by the terminal device 110 and computed therein, for example. These are non-limiting examples on how the awareness of an applied network representation may be maintained by the involved parties.

Figure 5:
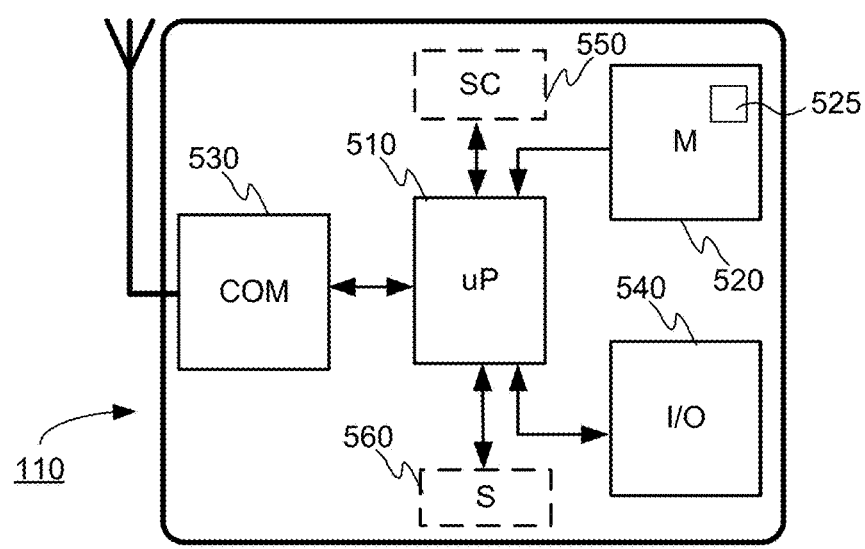
FIG. 5 illustrates schematically a terminal device according to an embodiment of the invention.

FIG. 5 illustrates schematically a terminal device 110 according to various embodiments of the invention suitable for performing at least some of the method steps as described in the foregoing description. The terminal device 110 may comprise at least one processor 510 arranged to control an operation of the terminal device 110. The terminal device 110 may also comprise at least one memory 520, at least one communication interface 530 and one or more input/output devices 540 for inputting and outputting information. The memory 520 may be arranged to store computer program code 525, but also further data, such as parameter data and any other data e.g. received and/or generated by the terminal device 110, such as the network representation. Further, the terminal device 110 may comprise a smart card 550 which may be needed e.g. for accessing to a communication network, such as to a mobile communication network. For example, the smart card 550 may operate as a subscriber identity module (SIM) for the mobile communication network. Still further, the terminal device 110 may comprise one or more sensors for obtaining measurement data, such as positioning data from satellite based positioning system. At least the mentioned entities may be arranged to communicate with each other through a data bus implemented in the terminal device 110. Naturally, the terminal device 110 comprises further hardware and software elements enabling an operation of the terminal device 110 in the manner as described.

Some aspects of the present invention may relate to computer program product which, when executed by at least one processor, cause the terminal device 110 to perform at least some portions of the method as described.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for generating position information of a terminal device served by a mobile communication network, the method comprising:
   receiving, by the terminal device, at least one signal, the at least one signal carrying data applicable in a determination of a position of the terminal device,
   determining the position of the terminal device expressed as a position data based on the at least one received signal,
   applying a masking function to determined position data, the masking function is dedicated to the terminal device,
   determining a slice within a time-dependent network representation in accordance with at least one network characteristic determined by the terminal device, the network representation describing a coverage of a cell as a plurality of sectors comprising a number of slices,
   generating a data record comprising: a masked position data of the terminal device; information on the determined slice; and at least one network parameter applied by the masking function, the at least one network parameter determined by the terminal device.

2. The method of claim 1, wherein the at least one signal carrying data applicable in the determination of the position of the terminal device is received from a number of base stations of the mobile communication network.

3. The method of claim 2, wherein the at least one signal carrying data applicable in the determination of the position of the terminal device is received from a number of satellites of a satellite-based navigation system in addition to the signal received from the number of base stations of the mobile communication network.

4. The method of claim 3, wherein the network representation of the mobile communication network is updated in accordance with a predetermined schedule.

5. The method of claim 2, wherein the network representation of the mobile communication network is updated in accordance with a predetermined schedule.

6. The method of claim 1, wherein the network representation of the mobile communication network is updated in accordance with a predetermined schedule.

7. The method of claim 1, wherein an indication of the network representation is included in the generated data record.

8. The method of claim 7, wherein the indication comprises at least one of: an identifier of the used network representation, a time stamp indicating an instant of time of the masking.

9. The method of claim 1, wherein at least one terminal device specific seed value received from the mobile communication network and at least one network parameter are applied as variables in the masking function.

10. The method of claim 9, wherein the at least one network parameter is at least one of: a modulation scheme assigned to the terminal device, a signal strength experienced by the terminal device, a distance of the terminal device from the base station serving the terminal device.

11. The method of claim 1, wherein the at least one network characteristic used for determining the slice is at least one of: modulation assigned to the terminal device, signal strength experienced by the terminal device, distance of the terminal device from the base station serving the terminal device.

12. A terminal device for generating position information, the terminal device is served by a mobile communication network, the terminal device comprising:
   at least one processor;
   at least one memory including computer program code;
   the at least one memory and the computer program code configured to, with the at least one processor, cause the terminal device to perform:
   receive at least one signal, the at least one signal carrying data applicable in a determination of a position of the terminal device,
   determine the position of the terminal device expressed as a position data based on the at least one received signal,
   apply a masking function to determined position data, the masking function is dedicated to the terminal device,
   determine a slice within a time-dependent network representation in accordance with at least one network characteristic determined by the terminal device, the network representation describing a coverage of a cell as a plurality of sectors comprising a number of slices,
   generate a data record comprising: a masked position data of the terminal device; information on the determined slice; and at least one network parameter applied by the masking function, the at least one network parameter determined by the terminal device.

13. The terminal device of claim 12, wherein the terminal device is arranged to receive the at least one signal carrying data applicable in the determination of the position of the terminal device from a number of base stations of the mobile communication network.

14. The terminal device of claim 13, wherein the terminal device is arranged to receive the at least one signal carrying data applicable in the determination of the position of the terminal device from a number of satellites of a satellite-based navigation system in addition to the signal received from the number of base stations of the mobile communication network.

15. The terminal device of claim 12, wherein the terminal device is arranged to update the network representation of the mobile communication network in accordance with a predetermined schedule.

16. The terminal device of claim 12, wherein the terminal device is arranged to include an indication of the network representation in the generated data record.

17. The terminal device of claim 12, wherein the terminal device is arranged to apply as variables of the masking function at least one terminal device specific seed value received from the mobile communication network and at least one network parameter.

18. The terminal device of claim 17, wherein the terminal device is arranged to use as the at least one network parameter at least one of: a modulation scheme assigned to the terminal device, a signal strength experienced by the terminal device, a distance of the terminal device from the base station serving the terminal device.

19. The terminal device of claim 12, wherein the terminal device is arranged to use as the at least one network characteristic used for determining the slice at least one of: modulation assigned to the terminal device, signal strength experienced by the terminal device, distance of the terminal device from the base station serving the terminal device.

20. A non-transitory computer-readable medium on which is stored a computer program for generating position information which, when executed by at least one processor, cause the terminal device to perform:

receiving at least one signal, the at least one signal carrying data applicable in a determination of a position of the terminal device, determining the position of the terminal device expressed as a position data based on the at least one received signal, applying a masking function to determined position data, the masking function is dedicated to the terminal device, determining a slice within a time-dependent network representation in accordance with at least one network characteristic determined by the terminal device, the network representation describing a coverage of a cell as a plurality of sectors comprising a number of slices, generating a data record comprising: a masked position data of the terminal device; information on the determined slice; and at least one network parameter applied by the masking function, the at least one network parameter determined by the terminal device.

* * * * *